United States Patent
Liu

(10) Patent No.: US 11,805,821 B2
(45) Date of Patent: Nov. 7, 2023

(54) METHOD FOR PREPARING POROUS GLASS FOR ELECTRONIC CIGARETTE

(71) Applicant: Lantian Guo, Shenzhen (CN)

(72) Inventor: Guiming Liu, Shenzhen (CN)

(*) Notice: Subject to any disclaimer, the term of this patent is extended or adjusted under 35 U.S.C. 154(b) by 50 days.

(21) Appl. No.: 17/643,412

(22) Filed: Dec. 8, 2021

(65) Prior Publication Data

US 2022/0330620 A1 Oct. 20, 2022

(30) Foreign Application Priority Data

Apr. 20, 2021 (CN) .......................... 202110424598.7

(51) Int. Cl.
*C03B 19/01* (2006.01)
*A24F 40/70* (2020.01)
*A24F 40/40* (2020.01)
*C03B 19/06* (2006.01)

(52) U.S. Cl.
CPC .............. *A24F 40/70* (2020.01); *A24F 40/40* (2020.01); *C03B 19/01* (2013.01); *C03B 19/066* (2013.01)

(58) Field of Classification Search
CPC .................................................... C03B 19/01
See application file for complete search history.

(56) References Cited

U.S. PATENT DOCUMENTS 2,797,201 A * 6/1957 Veatch ................ C03B 19/1075
521/64
3,744,984 A * 7/1973 Sato ........................ C03B 19/08
501/84

FOREIGN PATENT DOCUMENTS

CN 111138081 A * 5/2020

OTHER PUBLICATIONS

Translation of CN 111138081 (Year: 2020).*

* cited by examiner

*Primary Examiner* — Cynthia Szewczyk
(74) *Attorney, Agent, or Firm* — Novoclaims Patent Services LLC; Mei Lin Wong

(57) ABSTRACT

The present application discloses a method for preparing porous glass for an electronic cigarette, comprising the following steps: heating quartz glass to a molten state for granulation; mixing boron-silicon powder and quartz glass granules, and heating a mixture to a temperature between 600° C. to 900° C. to cover peripheries of the quartz glass granules with the boron-silicon powder; and sintering the quartz glass granules covered with boron-silicon in a preset mold to obtain the porous glass for the electronic cigarette. The technical solution according to the present application can greatly improve the smoking taste of the electronic cigarette.

2 Claims, No Drawings

METHOD FOR PREPARING POROUS GLASS FOR ELECTRONIC CIGARETTE

BACKGROUND OF THE PRESENT INVENTION

Field of Invention

The present application relates to the field of glass, and in particular, relates to a method for preparing porous glass for an electronic cigarette.

Description of Related Arts

Electronic cigarettes generally contain cigarette tar, which is heated and atomized to produce inhalable vapor or aerosol. An electronic cigarette device in the market generally includes a porous ceramic body having a large number of micropores inside for absorbing and transferring the above cigarette tar, and a heating element is disposed on a surface of the porous ceramic body to heat and atomize the absorbed cigarette tar. The micropores inside the porous body act as channels allowing the cigarette tar to infiltrate and flow to an atomizing surface on one hand, and on the other hand, act as air exchange channels to maintain a pressure balance inside a tar storage cavity by allowing outside supplementary air to enter the tar storage cavity after the cigarette tar in the tar storage cavity is consumed, such that, when the cigarette tar is heated and consumed by atomizing, air bubbles are generated inside the porous ceramic body and then emitted from a tar absorption surface to enter the tar storage cavity.

It is a common practice in the electronic cigarette industry to take the porous ceramic body having micropores as part of an atomizing device of the electronic cigarette. In recent years, in order to further precisely control the combustion velocity of the cigarette tar and optimize the smoking taste, the electronic cigarette industry has begun to try to incorporate porous glass as part into the atomizing device of the electronic cigarette. The porous glass used in the electronic cigarette needs to withstand extreme differences in temperature, and is greatly limited in its manufacturing process. A traditional method for preparing the porous glass is complex, which goes against the industrialization. Moreover, existing porous glass is made of flakes and has an uneven surface that is susceptible to holding dirt such as residual cigarette tar and dust, greatly affecting the smoking taste.

SUMMARY OF THE PRESENT INVENTION

To solve the problems existing in the prior art, the present application provides a method for preparing porous glass for an electronic cigarette. The method for preparing the porous glass for the electronic cigarette is applicable to the manufacturing of the porous glass covered with boron-silicon; the porous glass is applicable to the electronic cigarette and is endowed with the characteristics of the quartz glass; and the quartz glass granules in the porous glass has smooth surfaces, such that pores formed among the granules are less susceptible to holding the dirt and residual cigarette tar, thereby greatly improving the smoking taste of the electronic cigarette.

To solve the technical problem above, the present application employs a technical solution as follows:

A method for preparing porous glass for an electronic cigarette is provided, and includes the following steps: heating quartz glass to a molten state for granulation, by which quartz glass granules obtained have smooth surfaces; mixing boron-silicon powder and the quartz glass granules, and heating a mixture to a temperature between 600° C. to 900° C. to cover peripheries of the quartz glass granules with the boron-silicon powder; and sintering the quartz glass granules covered with boron-silicon in a preset mold to obtain the porous glass for the electronic cigarette, wherein the boron-silicon powder contains at least one selected from the group consisting of $SiO_2$, $P_2O_5$, $B_2O_3$, $Li_2O$, $ZnO$, $BaO$, $K_2O$, or $Na_2O$.

Preferably, in the step of heating the quartz glass to the molten state for granulation, the quartz glass is heated to 1200° C. and then is subjected to spray granulation.

Preferably, after the quartz glass is subjected to the spray granulation, the quartz glass granules obtained have a diameter that is not more than 0.1 mm.

Preferably, in the step of mixing the boron-silicon powder and the quartz glass granules and heating the mixture to a temperature between 600° C. to 900° C. to cover the peripheries of the quartz glass granules with the boron-silicon powder, the mixture of the boron-silicon powder and the quartz glass granules is heated to 860° C.

Preferably, the mixture of the boron-silicon powder and the quartz glass granules is heated to 860° C. and maintained at said temperature for 20 min.

Preferably, in the step of sintering the quartz glass granules covered with boron-silicon in the preset mold to obtain the porous glass for the electronic cigarette, the quartz glass granules covered with the boron-silicon is heated to 600° C. for sintering.

Preferably, in the step of sintering the quartz glass granules covered with boron-silicon in the preset mold to obtain the porous glass for the electronic cigarette, the method further includes: mixing the quartz glass granules covered the boron-silicon with an organic filler to control water absorption of the porous glass.

Preferably, the organic filler is plant fibers.

The technical solution according to the present application may have the following advantageous effects: a method for preparing porous glass for an electronic cigarette is provided, and includes the following steps: heating quartz glass to a molten state for granulation; mixing boron-silicon powder and quartz glass granules, and heating a mixture to a temperature between 600° C. to 900° C. to cover peripheries of the quartz glass granules with the boron-silicon powder; and sintering the quartz glass granules covered with boron-silicon in a preset mold to obtain the porous glass for the electronic cigarette. This method is applicable to the manufacturing of the porous glass covered with the boron-silicon; the porous glass is applicable to the electronic cigarette and is endowed with the characteristics of the quartz glass; and the quartz glass granules in the porous glass has smooth surfaces, such that pores formed among the granules are less susceptible to holding dirt and residual cigarette tar, thereby greatly improving the smoking taste of the electronic cigarette.

It should be understood that the general description above and the detailed description below are merely exemplary and explanatory, and are not intended to limit the present application.

DETAILED DESCRIPTION OF THE PREFERRED EMBODIMENT

Embodiments of the present application will be described in detail below. Examples of the embodiments are shown in the accompanying drawings, in which the same or similar reference signs indicate the same or similar elements or elements having the same or similar functions through the whole text. The following embodiments described with reference to the accompanying drawings are exemplary, and are intended to explain the present application, but should not be understood as a limit to the present application.

In the present application, unless otherwise clearly specified and defined, the terms such as "install", "connect", "connection", and "fix" should be understood in a broad sense. For example, a connection may be a fixated connection, or a detachable connection, or an integrated connection; may be a mechanical connection, or an electrical connection; may be a direct connection, or an indirect connection via an intermediate medium, or an internal connection between two elements. For those of ordinary skills in the art, the specific meanings of the above terms in the present application can be understood in accordance with specific conditions.

In the present application, unless otherwise clearly specified and defined, a first feature being "above" or "below" a second feature may include that the first and second features are in direct contact, or the first and second features are not in direct contact but in contact via an additional feature therebetween. Moreover, the first feature being "above", "on" or "over" the second feature includes that the first feature is directly or slantly above the second feature, or only indicates that the level of the first feature is higher than that of the second feature. the first feature being "below", "under" or "underneath" the second feature includes that the first feature is directly or slantly below the second feature, or only indicates that the level of the first feature is lower than that of the second feature.

The present application will be further illustrate in detail below in combination with specific embodiments and the accompanying drawings.

Embodiment 1

A method for preparing porous glass for an electronic cigarette included the following steps: heating quartz glass to a molten state for granulation, by which quartz glass granules obtained had smooth surfaces, wherein the surface roughness Ra of the quartz glass granules preferably had a value within 0.006 μm; mixing boron-silicon powder and the quartz glass granules, and heating a mixture to a temperature between 600° C. to 900° C. to cover peripheries of the quartz glass granules with the boron-silicon powder; and sintering the quartz glass granules covered with boron-silicon in a preset mold to obtain the porous glass for the electronic cigarette, wherein the boron-silicon powder contains $SiO_2$, $P_2O_5$, $B_2O_3$, $Li_2O$, ZnO, BaO, $K_2O$, and $Na_2O$.

In this embodiment, in the step of heating the quartz glass to the molten state for granulation, the quartz glass was heated to 1200° C. and then was subjected to spray granulation.

In this embodiment, after the quartz glass was subjected to the spray granulation, the quartz glass granules obtained had a diameter that was not more than 0.1 mm.

In this embodiment, in the step of mixing the boron-silicon powder and the quartz glass granules and heating the mixture to a temperature between 600° C. to 900° C. to cover the peripheries of the quartz glass granules with the boron-silicon powder, the mixture of the boron-silicon powder and the quartz glass granules was heated to 860° C.

During the production, the mixture of the boron-silicon powder and the quartz glass granules was preferably heated to 860° C. and maintained at said temperature for 20 min. At this temperature, the porous glass had good toughness and excellent anti-cracking effect, and might withstand the extreme temperature difference of more than 300° C. based on tests. Compared with the products in the mart, the porous glass was greatly improved.

In this embodiment, in the step of sintering the quartz glass granules covered with boron-silicon in the preset mold to obtain the porous glass for the electronic cigarette, the quartz glass granules covered with the boron-silicon was heated to 600° C. for sintering.

In this embodiment, in the preset mold to obtain the porous glass for the electronic cigarette, the method further included: mixing the quartz glass granules covered the boron-silicon with an organic filler to control the water absorption and pore size of the porous glass. The water absorption of the porous glass determines its capacity of storing the cigarette tar, and the pore size determines an absorption velocity for the cigarette tar. Based on this, the pore size can be controlled by providing the organic fillers of different diameters, thereby controlling the absorption velocity for the cigarette tar. In such a way, different smoking tastes can be obtained to meet the requirements of different products for the tar capacity and the tar absorption velocity.

The quartz glass was made of various pure natural molten quartz (such as crystal and quartz sand). It had an extremely small coefficient of linear expansion, which was $\frac{1}{10}$-$\frac{1}{20}$ that of common glass, and had excellent thermal shock resistance.

The method for preparing the porous glass for the electronic cigarette according to the present application is applicable to the manufacturing of the quartz glass granules covered with a boron-silicon material. The porous glass is endowed with the characteristics of the quartz porous glass, and also has the characteristics of good flame resistance and high physical strength. Compared with the common glass, the porous glass has the advantage of no toxic and side effect, is applicable to the atomizer of the electronic cigarette; and it is greatly improved in properties such as mechanical property, thermal stability, water resistance, alkali resistance, and acid resistance, and is applicable to the cigarette tar at the temperature within a variety of heating temperature range.

In this embodiment, the organic filler was plant fibers. In the description of the specification, the description of reference terms such as "an implementation mode", "some implementation modes", "an embodiment", "some embodiments", "example", "specific example", or "some examples" is intended to indicate the inclusion of a specific feature, structure, material, or characteristic as described in combination with said embodiment or example into at least one embodiment or example of the present application. In the specification, the schematic expressions of the above terms do not necessarily refer to the same embodiment or example. Moreover, the described specific feature, structure, material, or characteristic can be combined in an appropriate manner in any one or more embodiments or examples.

The description above further illustrates the present application in detail in conjunction with the specific embodiments, and it should not be deemed that the specific implementation of the present application is limited to these illustrations. For those of ordinary skills in the art to which the present application belongs, several simple deductions or substitutions can also be made without departing from the conception of the present application.

What is claimed is:

1. A method for preparing the porous glass for the electronic cigarette, comprising the steps of:

heating quartz glass to a molten state for granulation, and carrying out granulation to obtain quartz glass granules having smooth surfaces;

mixing boron-silicon powder and the quartz glass granules, and heating a mixture to a temperature between 600° C. to 900° C. to cover peripheries of the quartz glass granules with the boron-silicon powder; and sintering the quartz glass granules covered with boron-silicon in a preset mold to obtain the porous glass for the electronic cigarette, wherein the boron-silicon powder contains at least one selected from the group consisting of $SiO_2$, $P_2O_5$, $B_2O_3$, $Li_2O$, BaO, $K_2O$, or $Na_2O$, wherein the step of sintering the quartz glass granules covered with boron-silicon in the preset mold to obtain the porous glass for the electronic cigarette, the method further comprises, mixing the quartz glass granules covered the boron-silicon with an organic filler to control water absorption of the porous glass, wherein the organic filler is plant fibers.

2. The method for preparing the porous glass for the electronic cigarette according to claim 1, characterized in that: surface roughness Ra of the quartz glass granules has a value within 0.006 μm.

\* \* \* \* \*